United States Patent

Ebi

(10) Patent No.: US 7,121,718 B2
(45) Date of Patent: Oct. 17, 2006

(54) METHOD AND DEVICE FOR DETECTING DEFECTS IN SHEET METAL SEGMENTS OF ELECTRIC GENERATORS AND MOTORS

(75) Inventor: Gunter Ebi, Hohentengen (DE)

(73) Assignee: Sensoplan Aktiengesellschaft, Hohentengen (DE)

( * ) Notice: Subject to any disclaimer, the term of this patent is extended or adjusted under 35 U.S.C. 154(b) by 55 days.

(21) Appl. No.: 10/908,079

(22) Filed: Apr. 27, 2005

(65) Prior Publication Data

US 2005/0243891 A1 Nov. 3, 2005

(30) Foreign Application Priority Data

Apr. 28, 2004 (DE) .................. 10 2004 020 724

(51) Int. Cl.
*G01N 25/72* (2006.01)
*G01K 7/00* (2006.01)

(52) U.S. Cl. .................... 374/5; 374/137; 374/166
(58) Field of Classification Search ............. 374/5
See application file for complete search history.

(56) References Cited

U.S. PATENT DOCUMENTS

| 4,123,708 | A | * | 10/1978 | Vild et al. ................ 324/224 |
| 5,111,046 | A | * | 5/1992 | Bantel ......................... 374/5 |
| 5,680,059 | A | | 10/1997 | Shiota et al. ............. 324/772 |
| 5,701,044 | A | * | 12/1997 | Emshoff et al. ............ 310/54 |
| 5,828,227 | A | | 10/1998 | Shiota et al. ............. 324/772 |
| 5,917,334 | A | | 6/1999 | Grünewald et al. ....... 324/772 |
| 6,114,871 | A | | 9/2000 | Shiota et al. ............. 324/772 |
| 6,854,881 | B1 | * | 2/2005 | Nada ........................ 374/169 |

FOREIGN PATENT DOCUMENTS

JP 2003185690 7/2003

* cited by examiner

*Primary Examiner*—Gail Verbitsky
*Assistant Examiner*—Mirellys Jagan
(74) *Attorney, Agent, or Firm*—Gudrun E. Huckett

(57) ABSTRACT

In a method for detecting defects in sheet metal segments of electric generators and motors, wherein between the sheet metal pieces of the sheet metal segment an electric insulating layer is arranged, respectively, and wherein between the sheet metal segments a cooling channel is provided, respectively, magnetic induction is generated within the sheet metal segments by applying externally a magnetic field and the temperature of the heat generated within the sheet metal segment is measured in the cooling channel.

4 Claims, 1 Drawing Sheet

METHOD AND DEVICE FOR DETECTING DEFECTS IN SHEET METAL SEGMENTS OF ELECTRIC GENERATORS AND MOTORS

BACKGROUND OF THE INVENTION

The invention relates to a method for detecting defects in sheet metal segments of electric generators and electric motors, wherein between the sheet metal pieces of the sheet metal segments an electric insulating layer is arranged, respectively, and wherein between the sheet metal segments cooling channels are provided. The detection method comprises generating magnetic induction in the sheet metal segments by applying externally a magnetic field and measuring the temperature of the heat generated in the sheet metal segment. The invention further relates to a device for performing the method.

The present invention is designed for electric generators as well as electric motors for industrial applications. Such electric generators as well as electric motors are comprised of sheet metal segments of stacked sheet metal pieces. Thin electric insulation layers are arranged between the individual pairs of sheet metal pieces. The problem of these electric generators and motors resides in that, for example, as a result of aging or vibrations, loosening can occur, in particular, loosening of the windings within the package of sheet metal pieces, on the one hand, and loosening of the sheet metal pieces, on the other hand. The result of loosening of the sheet metal pieces is that the interposed insulation layers are subjected to wear. Because of this, short circuits can result which lead to heat generation and can cause core burning in extreme situations.

For detecting defects in the sheet metal segments with regard to possibly present wear of the insulators, it is known to apply an external magnetic field by means of a testing coil for high induction testing and to generate in this way magnetic induction within the sheet metal segment. In accordance with the level of wear, heat is generated within the sheet metal segment. This generated heat can be made visible by means of a thermocamera.

A disadvantage of this known method is that by means of a thermocamera only the surface of the sheet metal segments can be sensed with regard to the heat profile. A more precise information regarding the temperature in the interior of the sheet metal segment cannot be obtained in this way.

SUMMARY OF THE INVENTION

It is an object of the present invention to further develop the method of the aforementioned kind for detecting defects in sheet metal segments of electric generators and electric motors such that the degree of wear in the interior of the sheet metal segments can be evaluated better; moreover, a device for performing the method is to be provided.

In accordance with the present invention, this is achieved in regard to the method in that the temperature of the heat generated in the sheet metal segment is measured within the cooling channel.

By measuring the temperature of the heat generated in the sheet metal segment within the cooling channel, the temperature profile of the sheet metal segment can be determined areally. The advantage resides in that by the method according to the invention it can be detected very precisely at which location overheating occurs; this, in turn, allows to deduce that at this location the electrical insulation layer between two sheet metal pieces is defective. Based on this temperature profile, it can then be determined whether a repair can be carried out.

In a preferred embodiment of the present invention, over the length of the cooling channel individual measuring points are used that are spaced from one another. The more measuring points are provided, the more precise is the temperature profile that is obtained. The measuring points can be arranged linearly or like a matrix.

The object of the present invention is furthermore solved with regard to the device in that an elongate bar-shaped member (bar) is provided that can be inserted into the cooling channel; the bar is provided with several temperature sensors as measuring points that are distributed across its length.

The basic principle of the measuring device resides in providing a bar-shaped or areal member that is inserted into the intermediate space between two sheet metal segments, into the cooling channel. On the surface of the bar-shaped member, temperature sensors are provided so that in the inserted state of the bar the temperature profile can be measured. As mentioned before, these temperature sensors can be either arranged linearly or like a matrix, depending on how precisely the temperature profile is to be measured. The temperature sensors are connected by electric lines or cables to an electronic evaluation unit (computer).

In a preferred embodiment of the invention, the bar is provided with a terminal strip for electrical connections (terminals).

BRIEF DESCRIPTION OF THE DRAWING

One embodiment of the device according to the invention for detecting defects in sheet metal segments of electric generators and motors will be explained in more detail in the following with the aid of the drawing.

DESCRIPTION OF THE PREFERRED EMBODIMENTS

Figure 1:
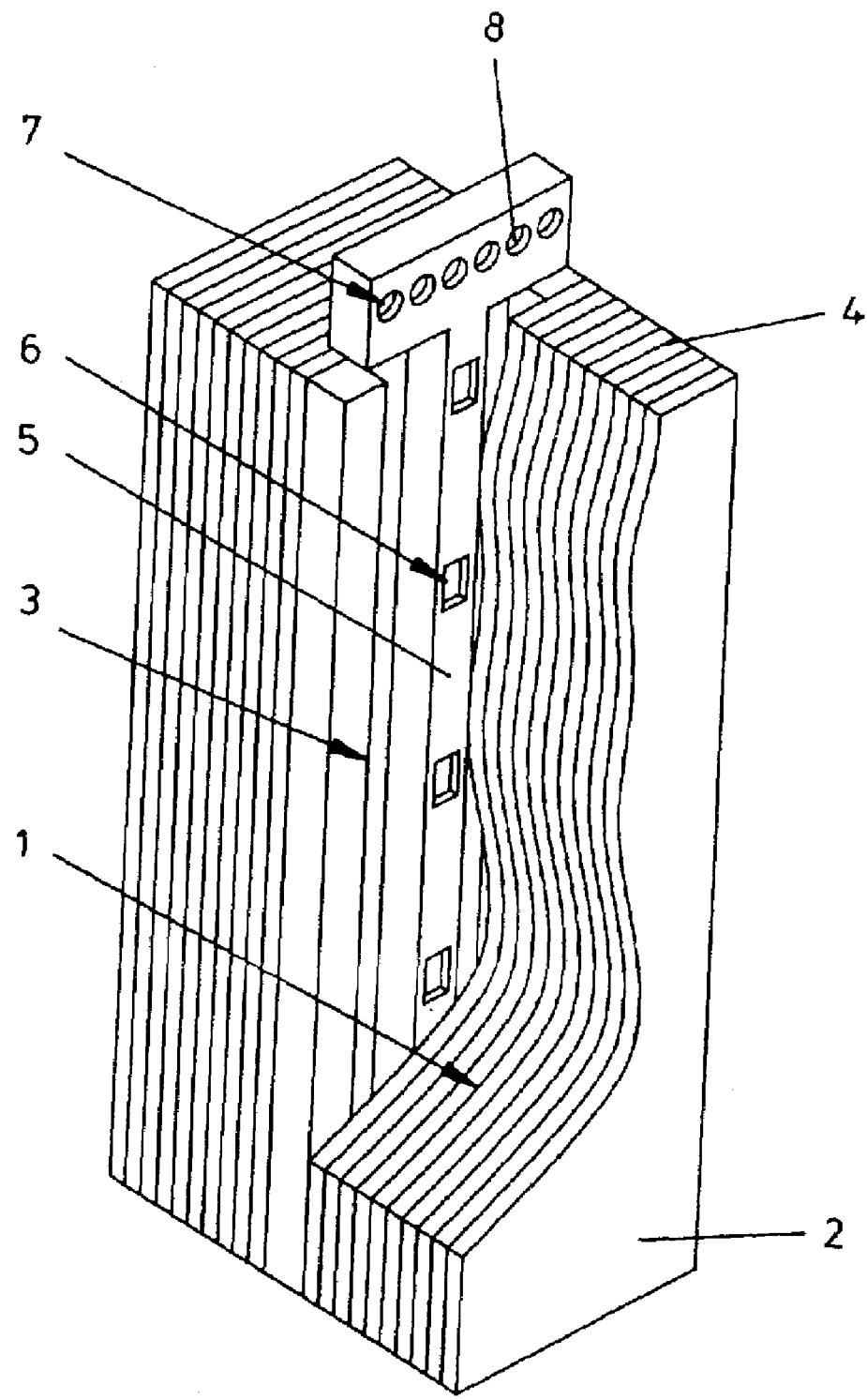
FIG. 1 is a perspective illustration of a partially cut-away sheet metal segment with a detection device according to the invention.

The illustrated sheet metal segment 1 of an electrical generator or electric motor is comprised of a stack of individual sheet metal pieces 2. In the illustrated embodiment, two sheet metal segments 1 are provided between which a cooling channel 3 is defined in the intermediate space.

Between two adjacent sheet metal pieces 2 of the sheet metal segment 1 an electric insulation layer 4 is provided, respectively. The insulation layer 4 is subject to wear, for example, caused by vibration of the generator, so that between the sheet metal pieces 2 short circuits can result which lead to heating of the sheet metal segment 1. This can cause core burning.

For this reason, the present invention proposes a method as well as a device for detecting defects in sheet metal segments 1 of electric generators and motors. As a detection device an elongate bar-shaped member (bar) 5 is provided. The bar-shaped member or bar 5 has several temperature sensors 6 distributed across its length. At the top, the bar-shaped member 5 is provided with a terminal strip 7 for electrical connections 8.

For a high induction test, the bar-shaped member 5 is inserted into the cooling channel 3 between two neighboring sheet metal segments 1, as illustrated in the drawing FIG. 1.

By means of the temperature sensors 6, across the length of the sheet metal segment 1 at temperature profile is measured. Based on this temperature profile, it can be determined whether within the sheet metal segment 1 at a certain location the electrical insulation layers 4 are worn. Based on the temperature profile, it therefore can be concretely determined at which location this wear has taken place. Based on this, it can be determined whether a repair is expedient and possible.

While specific embodiments of the invention have been shown and described in detail to illustrate the inventive principles, it will be understood that the invention may be embodied otherwise without departing from such principles.

What is claimed is:

1. A method for detecting defects in sheet metal segments of electric generators and electric motors, wherein between the sheet metal pieces of the sheet metal segment an electric insulating layer is arranged, respectively, and wherein between the sheet metal segments cooling channels are provided, respectively; the method comprising the steps of:

generating magnetic induction within the sheet metal segments by applying externally a magnetic field;

measuring in the cooling channel between the sheet metal segments the temperature of heat generated within the sheet metal segment.

2. The method according to claim 1, further comprising the step of using within the cooling channel individual measuring points for measuring the temperature, wherein the measuring points are spaced apart from one another in a longitudinal direction of the cooling channel.

3. A device for performing the method according to claim 1, the device comprising an elongate bar-shaped member adapted to be inserted into the cooling channel, wherein the elongate bar-shaped member has several temperature sensors that are arranged at a spacing relative to one another in a longitudinal direction of the bar-shaped member.

4. The device according to claim 3, wherein the bar-shaped member has a terminal strip for electrical connections.

\* \* \* \* \*